United States Patent
Long et al.

(10) Patent No.: US 7,392,892 B2
(45) Date of Patent: Jul. 1, 2008

(54) CONTROLLED LEAK COMPLIANCE AND METHOD FOR HYDRAULIC CLUTCH CONTROL SYSTEMS

(75) Inventors: Charles F. Long, Pittsboro, IN (US); Bryan H. Hagelskamp, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 357 days.

(21) Appl. No.: 11/187,568

(22) Filed: Jul. 22, 2005

(65) Prior Publication Data

US 2007/0017772 A1 Jan. 25, 2007

(51) Int. Cl.
*F16D 25/12* (2006.01)

(52) U.S. Cl. .................................. 192/85 R; 192/109 F
(58) Field of Classification Search ....................... None
See application file for complete search history.

(56) References Cited

U.S. PATENT DOCUMENTS 6,382,248 B1 * 5/2002 Long et al. .................. 137/557

* cited by examiner

*Primary Examiner*—Richard M Lorence

(57) ABSTRACT

The present invention provides a controlled leak within the clutch feed passage of the hydraulic clutch control system. The controlled leak will operate to provide compliance to the hydraulic clutch control system and may prevent pressure overshoot conditions during clutch trim. The controlled leak is only present during clutch trim and is discontinued during full apply conditions.

9 Claims, 2 Drawing Sheets

CONTROLLED LEAK COMPLIANCE AND METHOD FOR HYDRAULIC CLUTCH CONTROL SYSTEMS

TECHNICAL FIELD

This invention relates to hydraulic clutch control systems for the regulation of the engagement or apply pressure of a torque transmitting device or clutch.

BACKGROUND OF THE INVENTION

Many modern automatic transmissions use trim regulator valves, solenoid valves, and accumulators to control the apply pressure rise for an on-coming torque transmitting device such as a clutch or brake. The trim regulator valve controls the apply pressure gain from a value sufficient to overcome the spring force exerted by the clutch return springs to full engagement pressure. The maximum full engagement pressure occurs during vehicle operation requiring maximum engine torque and in some instances, maximum engine torque multiplied by a torque ratio of a torque converter, which can be as high as 3 to 1.

The trim pressure control at the lower end of the range is very important. During this portion of the clutch apply, it is necessary to overcome the return spring force and initiate frictional engagement. If the apply pressure rise is too rapid, a harsh shift feel may result.

Additionally, once the clutch is filled with hydraulic fluid pressure, an overshoot condition may occur if there is a lack of compliance within the hydraulic clutch control system, or if the solenoid valve is slow to react. Lower cost solenoid valves tend to exhibit slow reaction times. One way to eliminate the pressure overshoot condition is to add a continuous leak to the clutch feed passage. This leak will add additional compliance to the hydraulic clutch control system and, if designed properly, may eliminate pressure overshoots. This continuous leak is present at all times during clutch trim and full apply pressures. Additionally, some clutch designs employ additional hardware within the clutch such as compliance or wave plates. The plates are a mechanical means for introducing additional compliance within the hydraulic clutch control system during clutch apply conditions.

SUMMARY OF THE INVENTION

The present invention provides a controlled leak within the clutch feed passage of the hydraulic clutch control system thereby preventing pressure overshoot conditions during clutch trim. The controlled leak is only present during clutch trim and is discontinued during full apply pressure. The present invention is operable to eliminate pressure overshoot upon initial clutch fill, providing a stable hydraulic clutch control system and improved shift feel. Additionally, the present invention may allow the use of a lower cost solenoid valve that tends to have a slower response time.

Accordingly, the present invention provides a hydraulic clutch control system having a selectively engageable hydraulic clutch in fluid communication with a clutch feed passage and an accumulator. Also provided is a trim regulator valve, having a full apply and a trim condition, which is operable to provide fluid pressure to the clutch via the clutch feed passage. A selectively actuatable solenoid valve is disposed in fluid communication with the accumulator and the trim regulator valve. Additionally, a selectively blockable leak passage in fluid communication with the clutch feed passage and the accumulator is provided. The leak passage is operable to provide fluid flow from the clutch feed passage to the accumulator when the trim regulator valve is in the trim condition.

The accumulator of the present invention may have an accumulator body with a biased piston slidably disposed therein. The piston is operable to selectively block fluid flow from the leak passage when the full apply condition is provided to the clutch by the trim regulator valve. The solenoid valve of the present invention may be either a variable bleed solenoid valve or a pulse width modulated solenoid valve.

Another aspect of the present invention is a method of selectively providing compliance to a hydraulic clutch control system having a trim regulator valve for providing trim and full apply pressures, an accumulator, a hydraulic clutch, and a clutch feed passage. The method includes providing a selectively blockable leak passage between the clutch feed passage and the accumulator. Subsequently, allowing fluid flow through the leak passage, from the clutch feed passage to the accumulator, when the trim regulator valve is in a trim condition, thereby providing compliance to the hydraulic clutch control system. Thereafter, disallowing fluid flow through the leak passage, from the clutch feed passage to the accumulator, when the trim regulator valve is in a full apply condition, so that sufficient pressure is applied to the clutch by selectively blocking the leak passage.

The method may also provide for subsequently allowing fluid to flow through the leak passage, from the clutch feed passage to the accumulator, when the trim regulator valve is in the trim condition, again providing compliance to the hydraulic clutch control system. A piston, slidably disposed within the accumulator, may selectively block the leak passage.

Yet another aspect of the present invention is a controlled leak arrangement for a hydraulic clutch control system including a hydraulic clutch having a full apply mode and a trim mode of operation, an accumulator, a main pressure source of hydraulic fluid, and a control valve structure for the hydraulic fluid. The control valve structure has a first position, enabling communication of hydraulic fluid to the hydraulic clutch and the accumulator when the clutch is in the trim mode of operation. Additionally, the control valve structure has a second position enabling communication of hydraulic fluid to the clutch, but not the accumulator when the hydraulic clutch is in the full apply mode. The control valve structure may be a piston slidably disposed and biased within the accumulator and operable to selectively block an orifice.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
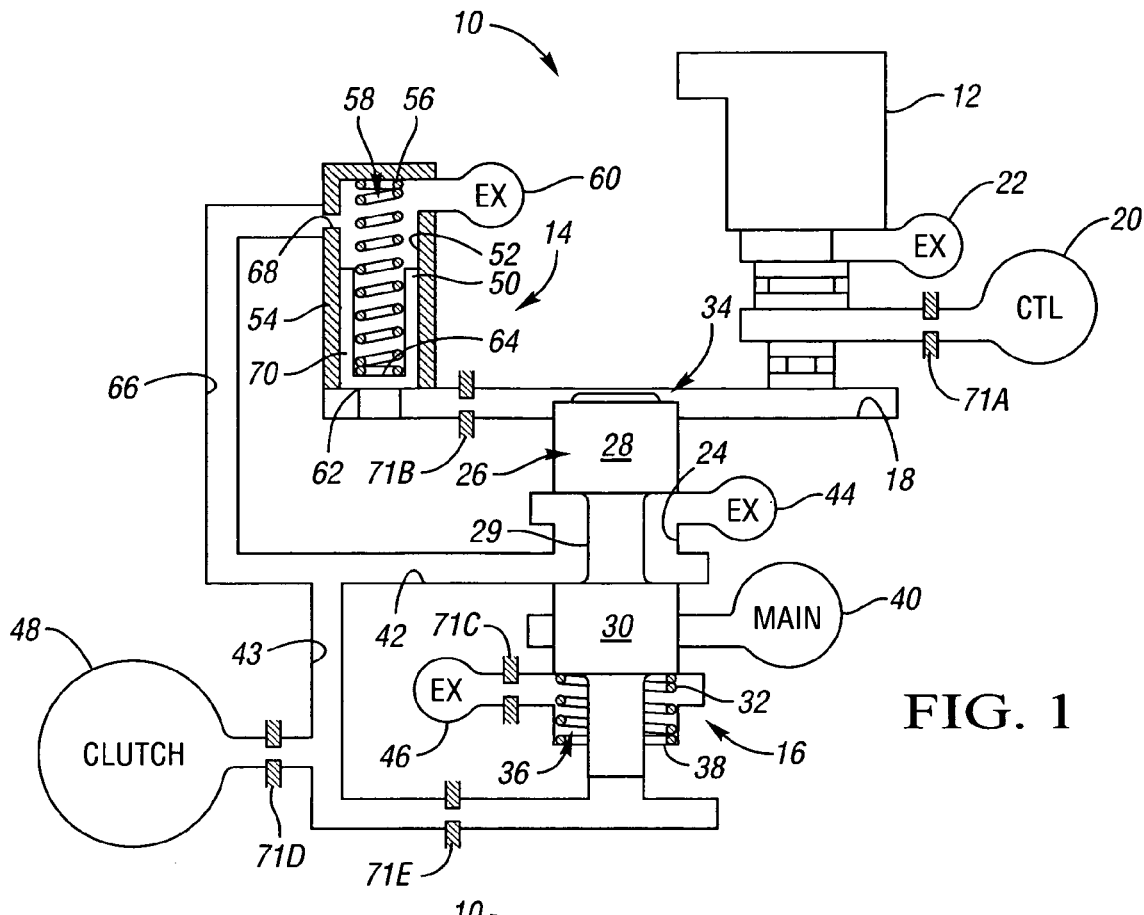
FIG. 1 is a schematic diagram of the hydraulic clutch control system consistent with the present invention illustrating the clutch off condition.
Figure 2:
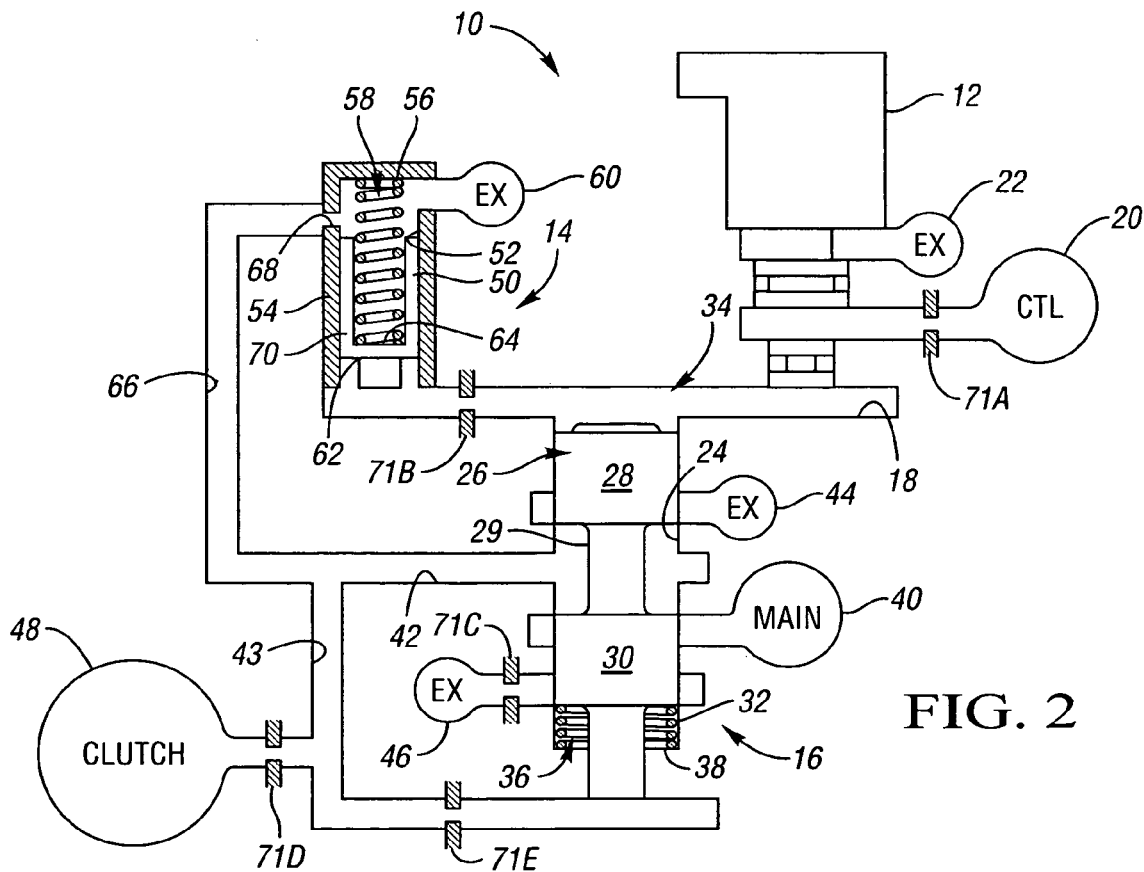
FIG. 2 is a schematic diagram of the hydraulic clutch control system consistent with the present invention illustrating the clutch trim condition.
Figure 3:
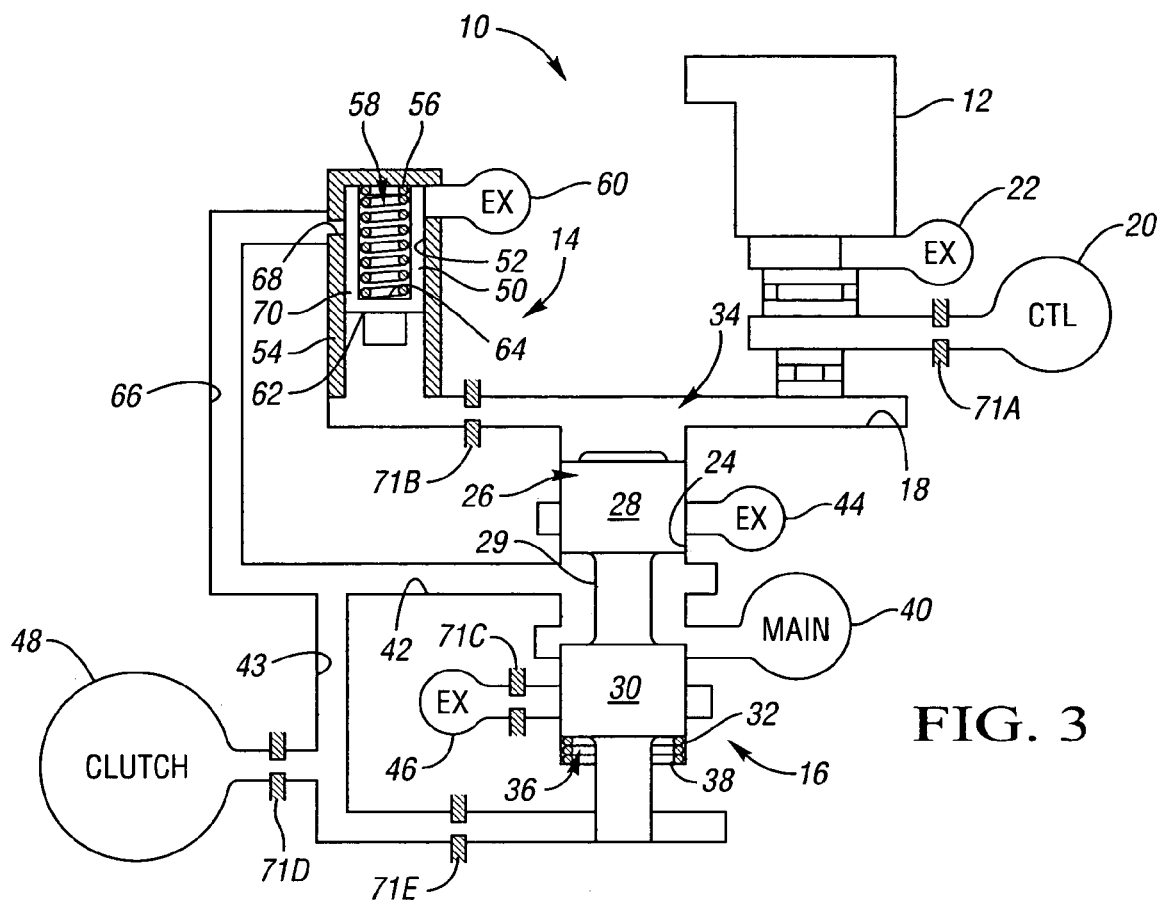
FIG. 3 is a schematic diagram of the hydraulic clutch control system consistent with the present invention illustrating the clutch full apply condition.

Referring to the drawings, wherein like characters represent the same or corresponding parts throughout the several views, there is seen in FIGS. 1 through 3 a hydraulic clutch control system 10 having a solenoid valve 12, an accumulator 14, and a trim regulator valve 16, all of which are in fluid communication via a control passage 18. The solenoid valve 12 may be a variable bleed solenoid (VBS), pulse width modulation (PWM) solenoid, or two-stage solenoid. Those skilled in the art may recognize additional solenoid valves that may be used while remaining within the scope of that which is claimed. Additionally, the solenoid valve 12 is in fluid communication with a control pressure source 20, which is operable to pressurize the control passage 18 upon actuation of the solenoid valve 12. When the solenoid valve 12 is de-actuated, latent pressure within the solenoid valve 12 is exhausted through an exhaust passage 22.

The trim regulator valve 16 has a bore 24 with a valve spool 26 slidably disposed therein. The valve spool 26 has a pair of spaced lands 28 and 30 with a valley 29 therebetween. A bias spring 32 urges the valve spool 26 into a volume 34 defined within the control passage 18. The spring 32 is situated in a chamber 36 defined by the land 30, an end portion 38, and the bore 24. The trim regulator valve 16 is in fluid communication with not only the control passage 18, but also a main pressure source 40, a clutch feed passage 42 and 43, and exhaust passages 44 and 46. The clutch feed passage 42 and 43 is the conduit through which a clutch 48 is in fluid communication with the trim regulator valve 16.

The accumulator 14 has a piston 50 slidably disposed within a bore 52 defined by an accumulator body 54. The piston 50 is biased by a spring 56 disposed within a chamber 58 defined by the piston 50 and the bore 52 of the accumulator body 54. The chamber 58 is in fluid communication with an exhaust passage 60. The exhaust passage 60 is operable to maintain the proper pressure differential on both a first face 62 and a second face 64 of the piston 50. Additionally, chamber 58 is in fluid communication with a leak passage 66 through an orifice 68. The leak passage 66 links the clutch feed passage 42 and 43 with the accumulator 14. A wall 70 of the piston 50 is designed in such a way that the wall 70 will block the orifice 68 when the accumulator is fully pressure stroked, as shown in FIG. 3. The orifices 71A, 71B, 71C, 71D, and 71E are provided to assist fluid flow control at various points within the hydraulic clutch control system 10. The placement and size of the orifices 71 is system dependant and will vary.

Figure 4:
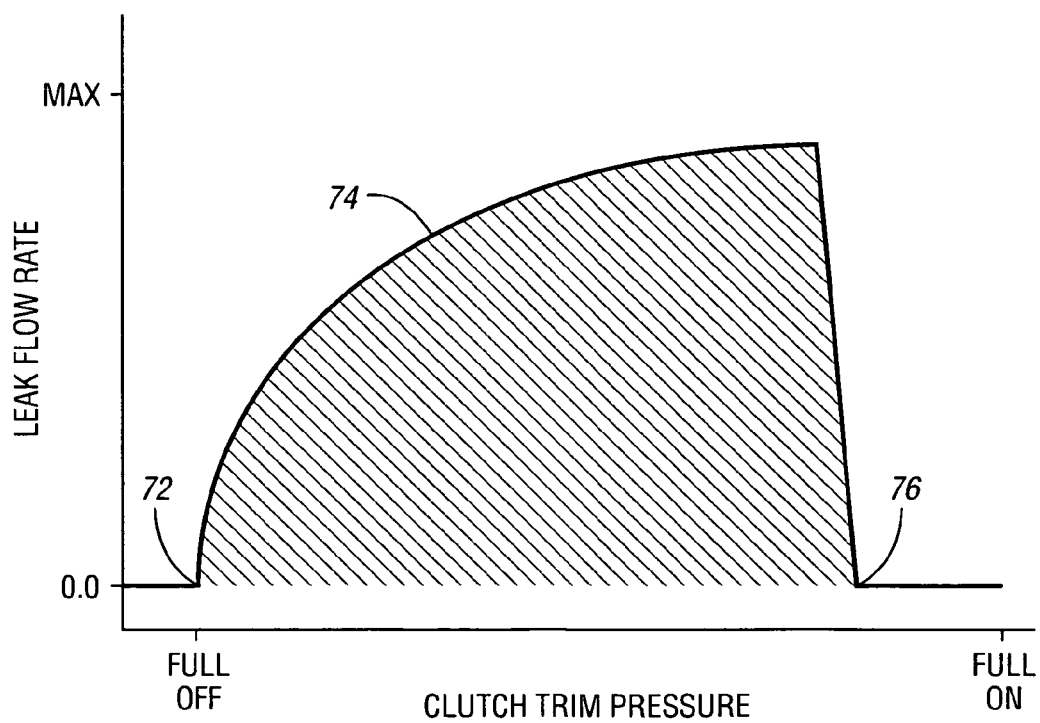
FIG. 4 is an exemplary graphical representation of the leak flow rate through the leak passage versus the clutch trim pressure of the clutch control system.

FIG. 1 is a schematic diagram of the hydraulic clutch control system 10 illustrating the clutch off condition. In this state, the solenoid valve 12 is not actuated and therefore the fluid pressure within the control passage 18 is at a minimum. As a result, the piston 50 within the accumulator 14 will remain fully biased by the spring 56, and the valve spool 26 of the trim regulator valve 16 will remain fully biased by the spring 32. In this position, the land 30 of the valve spool 26 will block the main pressure source 40. The valley 29 will be positioned in such a way as to allow the clutch 48 to exhaust any hydraulic fluid pressure through the feed passage 42 and 43 into the exhaust passage 44. The leak passage 66 is exhausted through the exhaust passage 44 via the clutch feed passage 42 and the exhaust passage 60. Therefore, the flow rate through the leak passage 66 will effectively be zero since the pressure differential across the orifice 68 is zero. This point is illustrated by point 72 of FIG. 4. FIG. 4 is an exemplary graphical representation of the fluid flow rate through the leak passage 66 versus the clutch trim pressure of the hydraulic clutch control system 10.

FIG. 2 is a schematic diagram of the hydraulic clutch control system 10 illustrating the clutch trim condition. In the clutch trim condition, the outlet pressure of the main pressure source 40 is regulated by the trim regulator valve 16 to a value lower than that within the main pressure source 40. This will provide a pressure gain within the clutch feed passage 42 and 43 which will allow the apply pressure of clutch 48 to be varied depending on the vehicle operating conditions. This is useful to provide a smooth shift transition between an on-coming clutch and an off-going clutch.

In the clutch trim phase of operation, the solenoid valve 12 will actuate allowing pressurized fluid contained within the control pressure source 20 to enter the control passage 18. The pressurized fluid within the control passage 18 will bias the valve spool 26 against the spring 32. When the pressure within the control passage 18 reaches a predetermined value, the land 28 will operate to block fluid flow between the clutch feed passage 42 and 43, and the exhaust passage 44. At approximately the same time, land 30 will begin to clear the main pressure source 40 thereby allowing a regulated amount of pressurized fluid to traverse the valley 29 of the valve spool 26 and enter the clutch feed passage 42 and 43 causing the clutch 48 to modulate.

The fluid momentum present at the end of clutch fill may produce an objectionable pressure overshoot condition. This may cause the operator of the vehicle to experience poor shift quality and present system controllability issues. This pressure overshoot condition typically occurs when there is insufficient system compliance or the response time of solenoid valve 12 is insufficient to prevent the pressure spikes. To provide compliance to the hydraulic clutch control system 10, the present invention allows an amount of fluid to bypass the clutch feed passage 42 via leak passage 66. The pressure differential across the orifice 68 will allow fluid to pass through the orifice 68 into the chamber 58 and out the exhaust passage 60. The additional system compliance provided by the present invention will allow the solenoid valve 12 to have a slower response time, than would typically be used in the hydraulic clutch control system 10. The fluid flow rate through the orifice 68 during clutch trim is represented by line 74 of FIG. 4. Those skilled in the art will recognize that this line is merely exemplary in nature, and that the shape of line 74 may be tailored with changes to orifice size, solenoid valve gain, etc.

FIG. 3 is a schematic diagram of the hydraulic clutch control system 10 illustrating the clutch full apply condition. In this state, the clutch 48 is fully engaged for maximum torque transmission. The solenoid valve 12 will actuate to increase the pressure provided to the control passage 18 by the control pressure source 20. The increased pressure within the control passage 18 will bias the valve spool 26 into the fully pressure set position. Thus allowing a nearly unregulated fluid flow from the main pressure source 40 into the clutch feed passage 42 and 43, thereby providing the clutch 48 with the maximum apply pressure available. Simultaneously, the fluid pressure within the control passage 18 will bias the piston 50, disposed within the accumulator 14, to a fully pressure set position. In such a state, the wall 70 of the piston 50 will operate to block the flow of fluid through the orifice 68. This point is represented by point 76 of FIG. 4.

The present invention also contemplates a method of selectively providing compliance to a hydraulic clutch control system 10 by providing a selectively blockable leak passage 66 between the clutch feed passage 42 and the accumulator 14. The leak passage 66 will allow fluid to flow from the clutch feed passage 42 to the accumulator 14 through the leak passage 66 when the trim regulator valve 16 is in trim, thereby providing compliance to the hydraulic clutch control system 10. Additionally, the method will disallow fluid flow from the clutch feed passage 42 and 43 to the accumulator 14 via the leak passage 66 when the trim regulator valve 16 provides a maximum apply pressure to the clutch 48 by selectively blocking the leak passage 66. The present invention also contemplates subsequently allowing fluid to flow from the clutch feed passage 42 and 43 to the accumulator 14 via the leak passage 66 when the trim regulator valve 16 is in trim, as shown in FIG. 2, again providing compliance to the hydraulic clutch control system 10.

By allowing fluid leakage only during clutch trim conditions, pressure overshoot conditions within the hydraulic clutch control system 10 may be eliminated while providing maximum apply pressure to the clutch 48 when full clutch engagement is needed. This control strategy may increase system efficiencies, reliability, and controllability with a minimum of additional hardware. Additionally, less responsive solenoid valves 12 may be employed with the present invention. This is particularly beneficial since the less responsive solenoid valves tend to be less expensive.

While the best modes for carrying out the invention have been described in detail, those familiar with the art to which this invention relates will recognize various alternative designs and embodiments for practicing the invention within the scope of the appended claims.

The invention claimed is:

1. A hydraulic clutch control system comprising:
  a selectively engageable hydraulic clutch in fluid communication with a clutch feed passage;
  an accumulator;
  a trim regulator valve having a full apply and a trim condition, and operable to provide fluid pressure to said clutch via said clutch feed passage;
  a selectively actuatable solenoid valve in fluid communication with said accumulator and said trim regulator valve; and
  a selectively blockable leak passage in fluid communication with said clutch feed passage and said accumulator, said leak passage being operable to provide fluid flow from said clutch feed passage to said accumulator when said trim regulator valve is in said trim condition.

2. The hydraulic clutch control system of claim 1, wherein said accumulator has an accumulator body with a biased piston slidably disposed therein, said piston being operable to selectively block fluid flow from said leak passage when said full apply condition is provided to said clutch by said trim regulator valve.

3. The hydraulic clutch control system of claim 1, wherein said solenoid valve is a variable bleed solenoid valve.

4. The hydraulic clutch control system of claim 1, wherein said solenoid valve is a pulse width modulation solenoid valve.

5. A method of selectively providing compliance to a hydraulic clutch control system having a trim regulator valve for providing trim and full apply pressures, an accumulator, a hydraulic clutch, and a clutch feed passage comprising:
  providing a selectively blockable leak passage between said clutch feed passage and said accumulator;
  allowing fluid flow through said leak passage, from said clutch feed passage to said accumulator, when said trim regulator valve is in a trim condition, thereby providing compliance to said hydraulic clutch control system; and
  disallowing fluid flow through said leak passage, from said clutch feed passage to said accumulator, when said trim regulator valve is in a full apply condition, so that sufficient pressure is applied to said clutch by selectively blocking said leak passage.

6. The method of selectively providing compliance to a hydraulic clutch control system of claim 5, wherein said leak passage is selectively blocked by a piston slidably disposed within said accumulator.

7. The method of selectively providing compliance to a hydraulic clutch control system of claim 5 further comprising:
  subsequently allowing fluid to flow through said leak passage, from said clutch feed passage to said accumulator, when said trim regulator valve is in said trim condition, again providing compliance to said hydraulic clutch control system.

8. A controlled leak arrangement for a hydraulic clutch control system comprising:
  a hydraulic clutch having a full apply mode and a trim mode of operation;
  an accumulator;
  a main pressure source of hydraulic fluid; and
  a control valve structure for said hydraulic fluid having a first position enabling communication of said hydraulic fluid from said main pressure source to said hydraulic clutch and said accumulator when said clutch is in said trim mode of operation, and a second position enabling communication of said hydraulic fluid from said main pressure source to said clutch, but not said accumulator when said hydraulic clutch is in said full apply mode.

9. The controlled leak arrangement for a hydraulic clutch control system of claim 8, wherein said control valve structure is a piston slidably disposed and biased within said accumulator and operable to selectively block an orifice.

* * * * *